(12) United States Patent
Fardid

(10) Patent No.: US 7,099,305 B1
(45) Date of Patent: Aug. 29, 2006

(54) SYSTEMS AND METHOD FOR AUTOMATED MONITORING OF AVAILABILITY IN XDSL ACCESS NETWORKS

(75) Inventor: Reza Fardid, Sunnyvale, CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 1052 days.

(21) Appl. No.: 10/136,138

(22) Filed: Apr. 30, 2002

(51) Int. Cl.
H04L 12/66 (2006.01)

(52) U.S. Cl. ...................... 370/352; 370/356

(58) Field of Classification Search ........ 370/352–356, 370/389, 401, 463, 465; 375/922
See application file for complete search history.

(56) References Cited

U.S. PATENT DOCUMENTS

| | | | |
|---|---|---|---|
| 5,893,905 A | 4/1999 | Main et al. | |
| 6,028,867 A | 2/2000 | Rawson et al. | |
| 6,137,839 A * | 10/2000 | Mannering et al. | 375/260 |
| 6,160,843 A | 12/2000 | McHale et al. | |
| 6,286,049 B1 | 9/2001 | Rajakarunanayake et al. | |
| 6,388,990 B1 | 5/2002 | Wetzel | |
| 6,459,702 B1 | 10/2002 | Saaverda et al. | |
| 6,463,079 B1 | 10/2002 | Sundaresan et al. | |
| 6,463,528 B1 | 10/2002 | Rajakarunanayake et al. | |
| 6,483,870 B1 * | 11/2002 | Locklear et al. | 375/222 |
| 6,538,998 B1 | 3/2003 | Garimella | |
| 6,580,718 B1 | 6/2003 | Chapman | |
| 6,584,074 B1 | 6/2003 | Vasamsetti et al. | |
| 6,587,883 B1 | 7/2003 | Rajakarunanayake | |
| 6,594,695 B1 | 7/2003 | Vasamsetti et al. | |
| 6,657,994 B1 | 12/2003 | Rajakarunanayake | |
| 2001/0043568 A1 * | 11/2001 | McHale et al. | 370/254 |
| 2005/0141563 A1 * | 6/2005 | McHale et al. | 370/493 |
| 2006/0098670 A1 * | 5/2006 | Voit et al. | 370/401 |

OTHER PUBLICATIONS

CAIDA, "Performance Measurement Tools Taxonomy," http://www.caida.org/tools/taxonomy/performace.xml, Jan. 21, 2001.

Dutta-Roy, A., "The Cost of Quality in Internet-Style Networks," IEEE Spectrum, Sep. 2000.

Mattews, W. et al., "The PingER Project: Active Internet Performance Monitoring for the HENP Community," IEEE Communications Mag., vol. 38, No. 5, May 2000.

Mahdavi, M. et al., "IPPM Metrics for Measuring Connectivity," http://www.ietf.org/rfc/rfc2678.txt, Sep. 1999.

(Continued)

*Primary Examiner*—Ajit Patel
(74) *Attorney, Agent, or Firm*—Jung-hua Kuo

(57) ABSTRACT

A system and method for automated monitoring of availability in xDSL access networks are disclosed. An xDSL access network with network availability monitoring generally comprises a measurement device in communication with a DSL access multiplexer (DSLAM) at a central office (CO), a broadband remote access server (BRAS) in communication with the DSLAM, a remote authentication dial-in user service (RADIUS) server in communication with the BRAS, and a data collector at a network operations center (NOC) in communication with the RADIUS server and the measurement device, the data collector being configured to retrieve data from the RADIUS server, the measurement device being configured to automatically establish a PPP session with the BRAS and the RADIUS server being adapted to collect data relating to the PPP session. The measurement device is preferably connected to the DSLAM via an xDSL loop terminating at a DSLAM monitoring port. In addition, the PPP session is preferably authenticated.

26 Claims, 4 Drawing Sheets

OTHER PUBLICATIONS

Malis, A. et al., "PPP over SONET/SDH," http://www.ietf.org/rfc/rfc2615.txt, Jun. 1999.

Azcorra, A. et al., "IP/ATM Integrated Services over Broadband Access Copper Technologies," IEEE Communications Mag., vol. 37, No. 5, May 1999.

Mamakos, L., "A Method for Transmitting PPP over Ethernet (PPPoE)," http://www.ietf.org/rfc/rfc2516.txt, Feb. 1999.

Gross, G. et al., "PPP over AAL5," http://www.ietf.org/rfc/rfc2364.txt, Jul. 1998.

Rigney, C., "RADIUS Accounting," http://www.ietf.org/rfc/rfc2139.txt, Apr. 1997.

Simpson, W., "PPP in Frame Relay," http://www.ietf.org/rfc/rfc1973.txt, Jun. 1996.

Simpson, W., "The Point-to-Point Protocol," http://www.ietf.org/rfc/rfc1661.txt, Jul. 1994.

T1A1.2 Working Group on Network Survivability Performance, "DRAFT Technical Report on IP Access Network Availability Defects per Million," Aug. 2001.

\* cited by examiner

SYSTEMS AND METHOD FOR AUTOMATED MONITORING OF AVAILABILITY IN XDSL ACCESS NETWORKS

BACKGROUND OF THE INVENTION

1. Field of the Invention

The present invention relates generally to monitoring of digital communication networks. More specifically, a system and method for automated monitoring of availability in xDSL access networks are disclosed.

2. Description of Related Art

An Internet user typically accesses the Internet by subscribing to an Internet Service Provider ("ISP"). The ISP accesses the Internet and transmits desired Internet content between the Internet user and the Internet content provider. The Internet user may also subscribe to high speed access to provide connection between the subscriber or client and the ISP to which the client subscribes. One example of high-speed access is via a digital subscriber line ("DSL"). DSL is generally provided by means of a connection-oriented packet network that provides connectivity among remote users or client premises and the Internet via ISPs. In a packet-based switching network, data is transmitted between the Internet content provider and a customer premises equipment ("CPE"), e.g., a modem, at the Internet user's site.

The connection-oriented packet network includes a DSL loop using a pair of twisted copper telephone lines extending between the CPE and a central office ("CO") of a telephone company such as an incumbent local exchange carrier ("ILEC"). Both competitive local exchange carriers ("CLECs") and ILECs can provide DSL service to clients. The connection-oriented packet network may further include ATM or Frame Relay switches. The network switches facilitate establishment of virtual circuits ("VC") between each client and the ISP to which the corresponding client subscribes The VC between each client and the ISP to which the corresponding client subscribes establishes connectivity between each client and the Internet via the respective ISP.

There are various types of DSL technologies with differing distance and bandwidth characteristics that provide connection-oriented packet connectivity. These various types of DSL are typically referred to as xDSL and may include, for example, asymmetric DSL (ADSL), symmetric DSL (SDSL), ISDN DSL (IDSL), high-speed DSL (HDSL), HDSL2, symmetric HDSL (SHDSL), very high-speed DSL (VDSL), as well as other emerging DSL technologies.

FIG. 1 is a block diagram illustrating an exemplary architecture for an xDSL access network 100. At a customer premise 104, a computer or PC 102 is in communication with a CPE 106 such as a DSL modem. The DSL modem 106 is in communication with a DSL access multiplexer (DSLAM) 108 located at a local CO over a pair of twisted copper telephone lines 110. Typically, several DSLAMs in a region are connected to a switch in a network access provider (NAP) backbone 112. The NAP backbone 112 may utilize any suitable wide area network (WAN) technology such as asynchronous transfer mode (ATM), synchronous optical network (SONET) or synchronous digital hierarchy (SDH), frame relay, T1, E1, T3, or E3. The NAP backbone 112 in turn aggregates user connections to a broadband remote access server (BRAS) 114 coupled to a Remote Authentication Dial-In User Service (RADIUS) server 118 in a PoP 116, typically managed by the NAP. The BRAS 114 is connected to a public network 120 such as the Internet which in turn provides connectivity to various network service providers (NSPs) 122. As is evident, the NAP typically owns and manages the transport networks that provide connectivity between the customer premises 104 and NSPs 122.

Typically, it is desirable for the NAP to monitor the quality of service (QoS) in the access network for various purposes such as performance evaluation and enhancement, as well as proactive reporting of service level agreement (SLA) compliance to partners and customers. One important metric of QoS is network availability, requiring regular periodic measurements. However, it is often difficult to effectively measure and monitor network availability in xDSL access networks due, at least in part, to the heterogeneous nature of xDSL access networks, which comprise various types of network technologies. Correlation of failure events across DSLAMs, Frame Relay/ATM switches, and BRAS devices to assess network unavailability in such large networks is impractical. In addition, utilizing the customer premises equipment, such as the DSL modem or the customer's computer, as a reference point for monitoring network connectivity on a regular basis is ineffective as the NAP typically does not control the CPE, which may be powered off at times by the end-user. Furthermore, the large and growing broadband subscriber base renders such an approach inefficient.

Service Level Agreements (SLAs) are generally contracts between service providers and customers that specify performance guarantees associated with various QoS metrics such as network availability, latency, and/or packet loss. SLAs often also specify penalties, typically in the form of rebates or credits, for failure to meet those performance guarantees.

Conventionally, monitoring of network availability for SLA compliance in homogenous layer 2 networks, such as ATM WANs, is performed by transmitting operations, administrations, and maintenance (OA&M) loopback cells on a periodic basis to verify network connectivity.

As another example, ping packets may be utilized to monitor network availability in networks based on the Internet Protocol (IP). The ping packets test connectivity between two points at regular intervals using Internet Control Message Protocol (ICMP) echo/reply. However, there are several drawbacks associated with the use of ICMP packet for monitoring the availability in networks. In particular, ping packets are generally given low priority in network devices such as routers and BRAS, as compared to high priority user or management traffic. Consequently, ICMP packets may be dropped or discarded during periods of greater network traffic or network congestion even when connectivity across the network is up. Thus, a lower than actual measure of network availability may result.

In addition, routers may block or rate-limit ICMP packets, including ping packets, because they can be easily utilized in certain security attacks. An example of such a security attack is a denial-of-service attack in which a large number of ping packets are sent to a network device, degrading its performance for user applications. Thus, the blocking or rate-limiting of ICMP packets at routers may adversely impact the results of connectivity or availability tests and monitoring.

Furthermore, ping packets are typically sourced from and targeted at network devices that support TCP/IP. Thus, DSL modems that are bridges and most DSLAMs are generally excluded from being a source or target of ping packets. Moreover, ping packets do not contain time-stamps that are typically required for monitoring the duration of connectivity loss.

Thus, what is needed is a system and method for a more efficient, convenient, and effective monitoring of the availability of xDSL access networks, thereby facilitating comparison of actual availability to that specified in a Service Level Agreement (SLA) with customers. Ideally, the system and method provides measurements that are independent of the type of user application.

SUMMARY OF THE INVENTION

A system and method for automated monitoring of availability in xDSL access networks are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

An xDSL access network with network availability monitoring generally comprises a measurement device in communication with a DSL access multiplexer (DSLAM) at a central office (CO), a broadband remote access server (BRAS) in communication with the DSLAM, a remote authentication dial-in user service (RADIUS) server in communication with the BRAS, and a data collector at a network operations center (NOC) in communication with the RADIUS server and the measurement device, the data collector being configured to retrieve data from the RADIUS server, the measurement device being configured to automatically establish a PPP session with the BRAS and the RADIUS server being adapted to collect data relating to the PPP session. The measurement device is preferably connected to the DSLAM via an xDSL loop terminating at a DSLAM monitoring port. In addition, the PPP session is preferably authenticated.

The RADIUS server optionally performs an authentication, authorization, and accounting (AAA) function to timestamp a start and a termination of the PPP session, the termination time-stamp being based on loss of a PPP keep-alive between the measurement device and the BRAS. When the PPP session is terminated, the BRAS or the measurement device preferably automatically and continually attempts to reestablish the PPP session. The data collector is configured to periodically retrieve the PPP session data and may aggregate the data for use by a reporter in generating reports such as minimum, average, and maximum network availability over the xDSL access network reports.

According to another preferred embodiment, a method for monitoring network availability of an xDSL access network generally comprises establishing a PPP session between a measurement device and a BRAS, the measurement device being in communication with a DSLAM at a central office and the BRAS being in communication with the DSLAM, collecting data relating to the PPP session by a RADIUS server in communication with the BRAS, and retrieving the PPP session data from the RADIUS server by a data collector.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for automated monitoring of availability in xDSL access networks are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
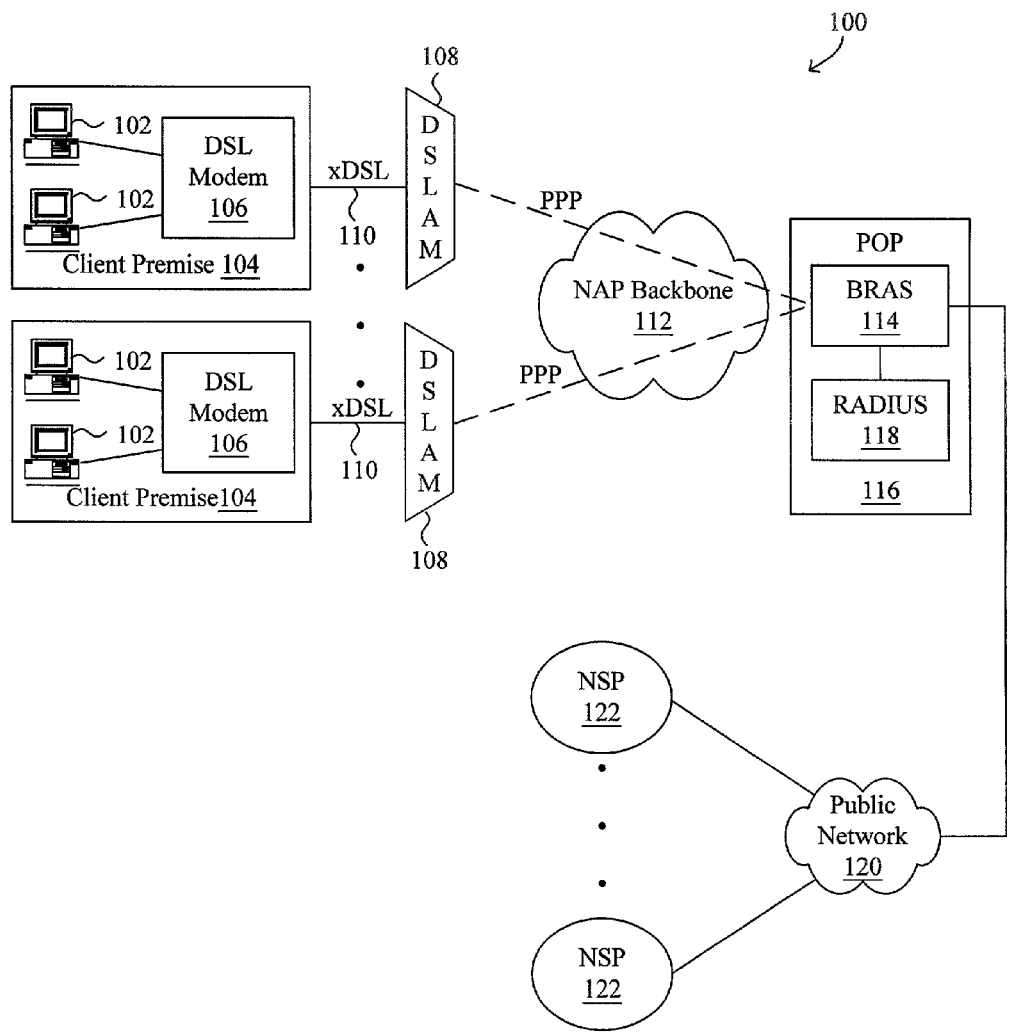
FIG. 1 is a block diagram illustrating an exemplary xDSL access network architecture.
Figure 2:
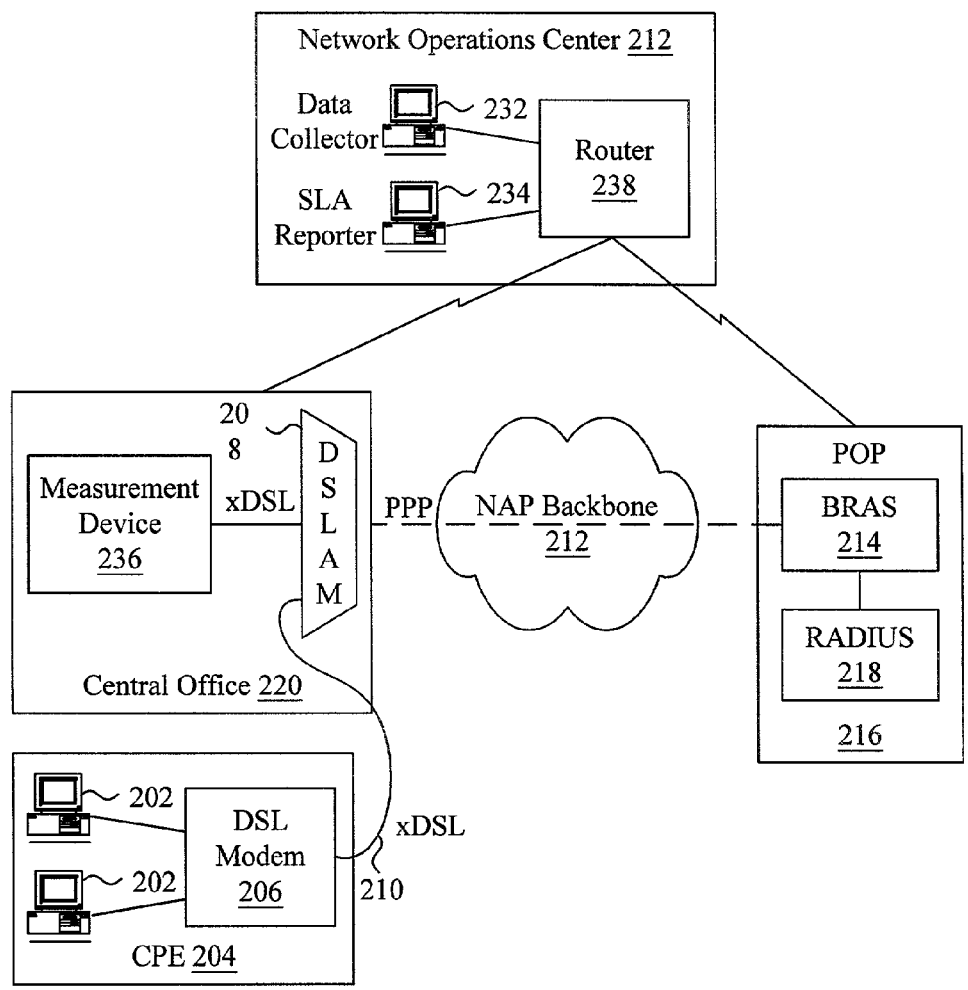
FIG. 2 is a block diagram illustrating an exemplary xDSL access network architecture with network availability monitoring.

FIG. 2 is a block diagram illustrating an exemplary architecture of an access network 200 with network availability monitoring. It is to be understood that although the access network 200 is generally described herein with reference to an xDSL access network, the access network 200 may implement any other communication mechanism such as T1 via a T1 loop in addition to or in place of xDSL. See, for example, "Draft Technical Report on IP Access Network Availability Defects per Million", T1A1.2 Working Group on Network Survivability Performance, T1-TR.xx-2001, August 2001, the entirety of which is incorporated by reference herein.

In particular, at a customer premise 204, a computer or PC 202 is in communication with a CPE 206 such as a DSL modem. The DSL modem 206 is in communication with a DSL access multiplexer (DSLAM) 208 located at a local CO 220 over a pair of twisted copper telephone lines 210. Typically, several DSLAMs in a region are connected to a switch in a network access provider (NAP) backbone 212. The NAP backbone 212 may utilize any suitable wide area network (WAN) technology such as asynchronous transfer mode (ATM), synchronous optical network (SONET) or synchronous digital hierarchy (SDH), frame relay, T1, E1, T3, or E3. The NAP backbone 212 in turn aggregates user connections to a broadband remote access server (BRAS) 214 physically or logically connected to a RADIUS (Remote Authentication Dial-In User Service) server 218 in a PoP 216, managed by the NAP. Although not shown, the BRAS 214 is connected to a public network, such as the Internet, that in turn provides connectivity to various network service providers (NSPs).

Internet Service Providers (ISPs) is one category of NSPs. ISPs commonly use point-to-point protocol (PPP) to support narrowband, dial-up access to end users at the customer premise 204 and/or to provide connectivity between the customer premise 204 and the BRAS 214 over xDSL (or T1) and the NAP backbone 212, as shown. Specifically, PPP provides various functions associated with remote connectivity between the customer premise 204 and NSPs, such as authentication, IP address assignment, domain name auto-configuration, security, encryption, and compression, and transport of different layer 3 protocols such as IP, Novel IPX, and AppleTalk. In addition, PPP runs over Ethernet which is widely used for small office/home office (SOHO) and business office local networking as well as over WAN technologies deployed in the NAP backbone 212 where T1/E1, frame relay, and ATM PVCs extend to the customer premise 204.

The xDSL access network 200 provides network availability monitoring capabilities by deploying an access network availability measurement device 236 at the CO 220 or at each DSLAM 208. The measurement device 236 is connected to a data collector and aggregator 232 and an SLA reporter 234 at a network operations center (NOC) 230 via, for example, a router 238. The measurement device 236 is typically controlled by the NOC 230, such as the data collector 232. It is noted that although the data collector 232 and an SLA reporter 234 are shown as separate systems, the data collector 232 and the SLA reporter 234 may be a single integrated system or any suitable number of systems.

According to a preferred embodiment, the measurement device 236 supports PPP, is NEBS-3 (Network Equipment Building Standard-3) compliant, contains an appropriate xDSL module, and connects to a port on the DSLAM 208 that is preferably designated for monitoring purposes. Note that NEBS-3 compliance is merely an ILEC requirement that restricts the types of measurement devices that can be used. Specifically, the measurements performed by the measurement device 236 are preferably based on PPP, which is widely deployed as a layer 2 protocol in xDSL access networks and runs over Ethernet, T1/E1, frame relay, ATM, SONET/SDH, and other technologies that are widely deployed at customer premises 204, NAP backbones 212, and on BRAS equipment 214. In addition, the measurement device 236 performs measurements independent of layer 3 protocol that runs over PPP, such as IP, Novel IPX, and AppleTalk.

The NOC 212 is also in communication with the BRAS 214 and RADIUS server 218 at the PoP 216 via the router 238 such that the data collector 232 at the NOC 212 can periodically and automatically retrieve accounting records from the RADIUS server 218. In particular, the measurement device automatically establishes a PPP session to the BRAS 214 at the NAP-managed PoP 216. Preferably, the PPP session is authenticated to ensure security. In addition, the data collector 232 preferably utilizes the accounting function of RADIUS server 218 at the NAP-managed PoP 216 to automatically time-stamp start and termination of each PPP session. Time-stamping of the termination of each PPP session may be based on loss of one or more PPP keep-alives between the measurement device 236 and the BRAS 214. Such time-stamping enables the NOC 212 to measure, determine, and report on the network availability. Further, the measurement device 236 or the BRAS 214 preferably automatically and continually attempts to reestablish a PPP session if the PPP session is terminated for any reason until either the PPP session is reestablished or until an optional predefined time out occurs.

The data collector 232 at the NOC 212 periodically and automatically collects and aggregates data recorded by RADIUS server 218. The SLA reporter 234 is in communication with the data collector 232 so that the SLA reporter 234 may periodically and automatically generate reports from the collected and/or aggregated data retrieved from the data collector 232. Examples of reports include monthly regional and national xDSL access network availability reports and minimum, average, and/or maximum access network availability reports. Such reports may be utilized for internal network performance enhancement and/or external SLA compliance.

The network availability monitoring provided by the xDSL access network 200 offers many advantages and provides an effective and efficient distributed monitoring mechanism across the xDSL access network 200. For example, the system 200 deploys the measurement device 236 within the CO 220 such that monitoring and measuring are made between points that the NAP controls, namely, the DSLAM 208 and the BRAS 214. Further, the system 200 can also be used for making additional QoS measurements, such as latency and packet loss to devices in any PoP 216 the NAP controls.

Furthermore, the monitoring preferably utilizes a PPP session such that once the PPP session is established, the PPP session is typically not terminated except at the occurrence of a failure. In other words, similar to an xDSL connection, the PPP session is nearly "always on." For example, a failures may occur if the port in the DSLAM 208 or the DSLAM 208 itself fails, the switch connecting the DSLAM 208 to the NAP backbone 212 fails, the switch connecting the BRAS 214 to the NAP backbone 212 fails, and/or the BRAS fails. However, it is noted that if the measurement device 236 fails, results from the monitoring and measurement may be adversely and inaccurately affected. Thus, typically, the only bias of the automated network availability monitoring mechanism is generally limited to between the measurement device 236 and the port at the DSLAM 208.

It is to be understood that although according to a preferred embodiment, the measurement device 236 is located in the CO 220, the measurement device 236 may be at an alternate location such as the NOC 230 or any other suitable location provided that the measurement device 236 is connected to a DSLAM via an xDSL loop. Preferably, the measurement device 236 is at a location that is controlled by the NAP such that the measurement device 236 itself may be monitored and is accessible by the NAP.

As noted above, although the exemplary access network 200 with network availability monitoring is described as implementing xDSL, any other suitable communication mechanism such as T1 may be alternatively or additionally implemented. For example, the DSLAM 208 may support standard T1 interfaces such that the measurement system 200 can also be utilized with T1 interfaces on the measurement device 236.

Figure 3:
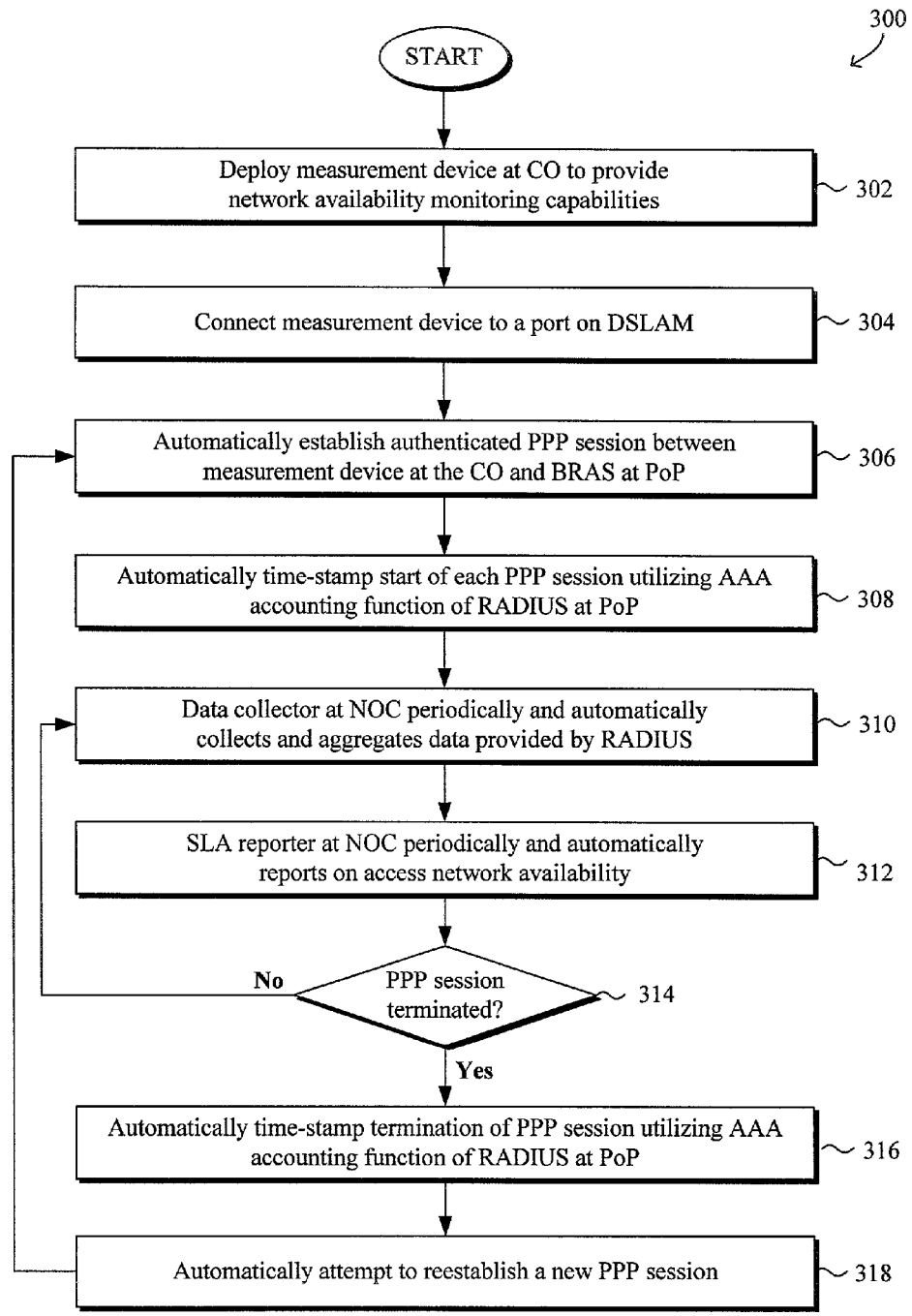
FIG. 3 is a flow chart illustrating an exemplary process for xDSL access network availability monitoring.

FIG. 3 is a flow chart illustrating an exemplary process 300 for xDSL access network availability monitoring. At step 302, a NAP operator deploys the measurement device at the CO or at each DSLAM in order to provide network availability monitoring capabilities. As discussed above, the measurement device is in communication with the data collector at the NOC via, for example, the router. The measurement device is typically controlled by the NOC.

At step 304, the measurement device is connected to a port on the DSLAM, preferably a port designated for monitoring purposes. Next, at step 306, the measurement device automatically establishes a PPP session to the BRAS at the PoP. Preferably, the PPP session is authenticated in order to ensure security. At step 308, the measurement device preferably utilizes the AAA accounting function of a RADIUS server at the NAP-managed PoP to automatically time-stamp start of each PPP session.

At step 310, the data collector at the NOC preferably periodically and automatically collects and aggregates data provided by the RADIUS server. In addition, at step 312, the SLA reporter at the NOC preferably periodically and automatically reports on the access network availability, such as monthly or periodic regional or national availability over the entire xDSL access network for internal network performance enhancement and/or external SLA compliance.

In addition, at step 314, the RADIUS server records if the PPP session is terminated, i.e., when there is a loss of one or more PPP keep-alives between the measurement device and the BRAS. If the PPP session is still alive, then the process 300 returns to step 310 to continue with the measurement and reporting functions.

Alternatively, if the PPP session is no longer alive, i.e., is terminated, then at step 316, the measurement device preferably utilizes the AAA accounting function of the RADIUS server at the NAP-managed PoP to automatically time-stamp the termination of the PPP session. At step 318, the measurement device automatically attempts to reestablish a new PPP session when the previous PPP session is terminated for any reason. It is noted that while step 314 is shown following step 312, the process of determining whether the PPP session has terminated may be performed simultaneously with or after any of steps 308, 310, and/or 312. After step 318, the process 300 then returns to step 306 to attempt to establish a new authenticated PPP session between the measurement device at the CO and the BRAS at the PoP.

Figure 4:
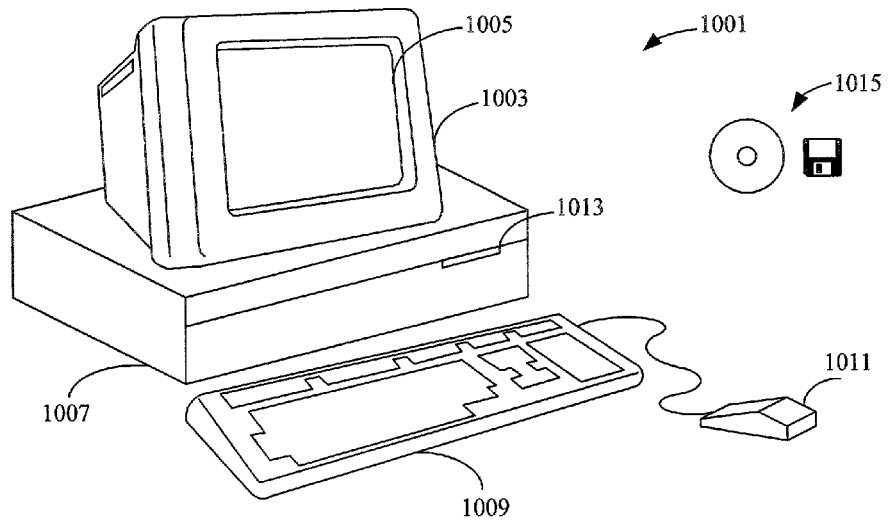
FIG. 4 illustrates an example of a computer system that can be utilized with the various embodiments of method and processing described herein.
Figure 5:
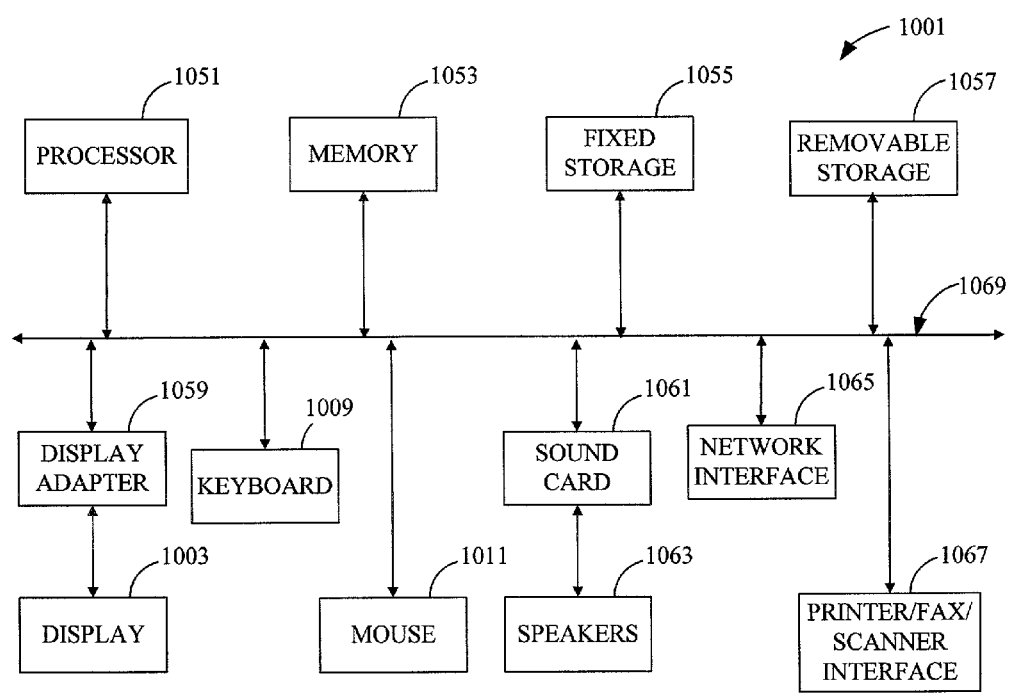
FIG. 5 illustrates a system block diagram of the computer system of FIG. 4.

FIGS. 4 and 5 illustrate a schematic and a block diagram, respectively, of an exemplary general purpose computer system 1001 suitable for executing software programs that implement the methods and processes described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An xDSL access network with network availability monitoring, comprising:
   a measurement device in communication with a DSL access multiplexer (DSLAM) at a central office;
   a broadband remote access server (BRAS) in communication with the DSLAM;
   a remote authentication dial-in user service (RADIUS) server in communication with the BRAS; and
   a data collector at a network operations center in communication with the RADIUS server and the measurement device, the data collector being configured to retrieve data from the RADIUS server,
   wherein the measurement device is configured to automatically establish a PPP session with the BRAS and wherein the RADIUS server is adapted to collect data relating to the PPP session.

2. The xDSL access network with network availability monitoring of claim 1, wherein the data collector is configured to automatically and periodically retrieve the data collected by the RADIUS server relating to the PPP session.

3. The xDSL access network with network availability monitoring of claim 1, wherein the RADIUS server is configured to perform an authentication, authorization, and accounting (AAA) function to automatically time-stamp a start and a termination of the PPP session.

4. The xDSL access network with network availability monitoring of claim 3, wherein the RADIUS server is configured to automatically time-stamp the termination of the PPP session based on loss of a PPP keep-alive between the measurement device and the BRAS.

5. The xDSL access network with network availability monitoring of claim 1, wherein one of the BRAS and the measurement device is configured to automatically and continually attempt to reestablish the PPP session upon termination of the PPP session.

6. The xDSL access network with network availability monitoring of claim 1, wherein the DSLAM includes a monitoring port and wherein the measurement device is in communication with the DSLAM via the DSLAM monitoring port.

7. The xDSL access network with network availability monitoring of claim 1, wherein the measurement device is configured to automatically establish a PPP session with the BRAS via a network access provider (NAP) backbone.

8. The xDSL access network with network availability monitoring of claim 1, wherein the data collector at the network operations center is in communication with the RADIUS server and the measurement device via a router.

9. The xDSL access network with network availability monitoring of claim 1, wherein the measurement device is in communication with the DSLAM via at least one of an xDSL loop and a T1 loop.

10. The xDSL access network with network availability monitoring of claim 1, wherein the data collector includes a data aggregator adapted to aggregate the data collected by the data collector.

11. The xDSL access network with network availability monitoring of claim 1, further comprising a reporter in communication with the data collector and adapted to generate reports based on the data collected by the data collector.

12. The xDSL access network with network availability monitoring of claim 11, wherein the reports are selected from the group consisting of periodic regional, periodic national, minimum, average, and maximum access network availability over the xDSL access network reports, and latency and packet loss reports.

13. The xDSL access network with network availability monitoring of claim 1, wherein the PPP session is an authenticated PPP session.

14. A method for monitoring network availability of an xDSL access network, comprising:
   automatically establishing a PPP session by a measurement device to a broadband remote access server (BRAS), the measurement device and the BRAS being in communication with a DSL access multiplexer (DSLAM) at a central office;
   automatically collecting data relating to the PPP session by a remote authentication dial-in user service (RADIUS) server, the RADIUS server being in communication with the BRAS; and
   automatically retrieving the PPP session data from the RADIUS server by a data collector.

15. The method for monitoring network availability of an xDSL access network of claim 14, wherein said retrieving the PPP session data by the data collector is performed periodically.

16. The method for monitoring network availability of an xDSL access network of claim 14, further comprising performing an authentication, authorization, and accounting (AAA) function to automatically time-stamp a start and a termination of the PPP session by the RADIUS server.

17. The method for monitoring network availability of an xDSL access network of claim 16, wherein the time-stamping of the PPP session termination by the RADIUS server is based on loss of a PPP keep-alive between the measurement device and the BRAS.

18. The method for monitoring network availability of an xDSL access network of claim 14, further comprising automatically and continually attempting to reestablish the PPP session upon termination of the PPP session by the measurement device.

19. The method for monitoring network availability of an xDSL access network of claim 14, wherein the measurement device is in communication with the DSLAM via a monitoring port of the DSLAM.

20. The method for monitoring network availability of an xDSL access network of claim 14, wherein said establishing the PPP session is between the measurement device and the BRAS via a network access provider (NAP) backbone.

21. The method for monitoring network availability of an xDSL access network of claim 14, wherein said retrieving the PPP session data from the RADIUS server by the data collector is via a router.

22. The method for monitoring network availability of an xDSL access network of claim 14, wherein the measurement device is in communication with the DSLAM via one of an xDSL loop and a T1 loop.

23. The method for monitoring network availability of an xDSL access network of claim 14, further comprising aggregating the data collected by the data collector.

24. The method for monitoring network availability of an xDSL access network of claim 14, generating reports based on the PPP session data by a reporter in communication with the data collector.

25. The method for monitoring network availability of an xDSL access network of claim 24, wherein the reports are selected from the group consisting of periodic regional, periodic national, minimum, average, and maximum access network availability over the xDSL access network reports, and latency and packet loss reports.

26. The method for monitoring network availability of an xDSL access network of claim 14, wherein said establishing the PPP session comprises establishing an authenticated PPP session.

* * * * *

UNITED STATES PATENT AND TRADEMARK OFFICE
CERTIFICATE OF CORRECTION

PATENT NO. : 7,099,305 B1
APPLICATION NO. : 10/136138
DATED : August 29, 2006
INVENTOR(S) : Reza Fardid Page 1 of 1

It is certified that error appears in the above-identified patent and that said Letters Patent is hereby corrected as shown below:

Cover Page, Title
Please delete "Systems" and insert --System--

Signed and Sealed this

Ninth Day of January, 2007

JON W. DUDAS
*Director of the United States Patent and Trademark Office*